United States Patent
Katko et al.

(10) Patent No.: US 11,937,199 B2
(45) Date of Patent: Mar. 19, 2024

(54) TIME-DIVISION-DUPLEX REPEATERS WITH GLOBAL NAVIGATION SATELLITE SYSTEM TIMING RECOVERY

(71) Applicant: Pivotal Commware, Inc., Kirkland, WA (US)

(72) Inventors: Alexander Remley Katko, Seattle, WA (US); Melroy Machado, Seattle, WA (US); Marius Marcel Pop, Gig Harbor, WA (US); Jacob Tyler Repp-Bartel, Snohomish, WA (US); Daniel Lee Schaeffer, Seattle, WA (US)

(73) Assignee: Pivotal Commware, Inc., Bothell, WA (US)

( * ) Notice: Subject to any disclaimer, the term of this patent is extended or adjusted under 35 U.S.C. 154(b) by 0 days.

(21) Appl. No.: 18/136,238

(22) Filed: Apr. 18, 2023

(65) Prior Publication Data

US 2023/0337162 A1    Oct. 19, 2023

Related U.S. Application Data

(60) Provisional application No. 63/332,118, filed on Apr. 18, 2022.

(51) Int. Cl.
*H04W 56/00*    (2009.01)
*H04B 7/155*    (2006.01)

(52) U.S. Cl.
CPC ........ *H04W 56/0045* (2013.01); *H04B 7/155* (2013.01); *H04W 56/0015* (2013.01)

(58) Field of Classification Search
CPC ............. H04W 64/00; H04W 56/0015; H04W 56/001; H04W 24/02; H04W 24/10; H04W 56/00; H04W 72/0446; H04W 8/005; H04L 1/0003; H04L 1/0009; H04L 1/1887; H04L 1/0006; H04J 3/0638
See application file for complete search history.

(56) References Cited

U.S. PATENT DOCUMENTS

| | | |
|---|---|---|
| 2,131,108 A | 9/1938 | Lindenblad |
| 4,464,663 A | 8/1984 | Lalezari et al. |
| 6,133,880 A | 10/2000 | Grangeat et al. |

(Continued)

FOREIGN PATENT DOCUMENTS

| | | |
|---|---|---|
| AU | 2019239864 B2 | 9/2020 |
| AU | 2020226298 A1 | 2/2023 |

(Continued)

OTHER PUBLICATIONS

Office Communication for Japanese Patent Application No. JP 2021-505304 dated May 9, 2023, pp. 1-6.

(Continued)

*Primary Examiner* — Khalid W Shaheed
(74) *Attorney, Agent, or Firm* — John W. Branch; Branch Partners PLLC (57) ABSTRACT

A repeater for wireless communications systems can include a time-division-duplex (TDD) architecture with a timing recovery system for switching between uplink and downlink. In some approaches, the timing recovery system can receive a timing reference from a global navigation satellite system (GNSS) such as Global Positioning System (GPS), Global Navigation Satellite System (GLONASS), or Galileo.

19 Claims, 5 Drawing Sheets

(56) References Cited

U.S. PATENT DOCUMENTS

| | | | |
|---|---|---|---|
| 6,150,987 A | 11/2000 | Sole et al. |
| 6,529,745 B1 | 3/2003 | Fukagawa et al. |
| 6,680,923 B1 | 1/2004 | Leon |
| 7,084,815 B2 | 8/2006 | Phillips et al. |
| 7,205,949 B2 | 4/2007 | Turner |
| 8,711,989 B1 | 4/2014 | Lee et al. |
| 9,356,356 B2 | 5/2016 | Chang et al. |
| 9,385,435 B2 | 7/2016 | Bily et al. |
| 9,450,310 B2 | 9/2016 | Bily et al. |
| 9,551,785 B1 | 1/2017 | Geer |
| 9,608,314 B1 | 3/2017 | Kwon et al. |
| 9,635,456 B2 | 4/2017 | Fenichel |
| 9,711,852 B2 | 7/2017 | Chen et al. |
| 9,806,414 B2 | 10/2017 | Chen et al. |
| 9,806,415 B2 | 10/2017 | Chen et al. |
| 9,806,416 B2 | 10/2017 | Chen et al. |
| 9,812,779 B2 | 11/2017 | Chen et al. |
| 9,813,141 B1 | 11/2017 | Marupaduga et al. |
| 9,936,365 B1 | 4/2018 | Elam |
| 9,955,301 B2 | 4/2018 | Markhovsky et al. |
| 10,014,948 B2 | 7/2018 | Ashrafi |
| 10,020,891 B2 | 7/2018 | Ashrafi |
| 10,033,109 B1 | 7/2018 | Gummalla et al. |
| 10,153,845 B2 | 12/2018 | Ashrafi |
| 10,187,156 B2 | 1/2019 | Ashrafi |
| 10,225,760 B1 | 3/2019 | Black |
| 10,277,338 B2 | 4/2019 | Reial et al. |
| 10,313,894 B1 | 6/2019 | Desclos et al. |
| 10,324,158 B2 | 6/2019 | Wang et al. |
| 10,326,203 B1 | 6/2019 | Black et al. |
| 10,333,217 B1 | 6/2019 | Black et al. |
| 10,374,710 B2 | 8/2019 | Ashrafi |
| 10,425,905 B1 | 9/2019 | Black et al. |
| 10,431,899 B2 | 10/2019 | Bily et al. |
| 10,468,767 B1 | 11/2019 | McCandless et al. |
| 10,491,303 B2 | 11/2019 | Ashrafi |
| 10,505,620 B2 | 12/2019 | Ito et al. |
| 10,522,897 B1 | 12/2019 | Katko et al. |
| 10,524,154 B2 | 12/2019 | Black |
| 10,524,216 B1 | 12/2019 | Black et al. |
| 10,547,386 B2 | 1/2020 | Ashrafi |
| 10,594,033 B1 | 3/2020 | Black et al. |
| 10,673,646 B1 | 6/2020 | Shinar et al. |
| 10,734,736 B1 | 8/2020 | McCandless et al. |
| 10,862,545 B2 | 12/2020 | Deutsch et al. |
| 10,863,458 B2 | 12/2020 | Black et al. |
| 10,971,813 B2 | 4/2021 | McCandless et al. |
| 10,998,642 B1 | 5/2021 | McCandless et al. |
| 11,026,055 B1 | 6/2021 | Rea |
| 11,069,975 B1 | 7/2021 | Mason et al. |
| 11,088,433 B2 | 8/2021 | Katko et al. |
| 11,190,266 B1 | 11/2021 | Black et al. |
| 11,252,731 B1 | 2/2022 | Levitsky et al. |
| 11,279,480 B1 | 3/2022 | Rezvani |
| 11,297,606 B2 | 4/2022 | Machado et al. |
| 11,374,624 B2 | 6/2022 | Deutsch et al. |
| 11,424,815 B2 | 8/2022 | Black et al. |
| 11,431,382 B2 | 8/2022 | Deutsch et al. |
| 11,451,287 B1 | 9/2022 | Sivaprakasam et al. |
| 11,463,969 B2 | 10/2022 | Li et al. |
| 11,497,050 B2 | 11/2022 | Black et al. |
| 11,563,279 B2 | 1/2023 | McCandless et al. |
| 11,670,849 B2 | 6/2023 | Mason et al. |
| 11,706,722 B2 | 7/2023 | Black et al. |
| 11,757,180 B2 | 9/2023 | McCandless et al. |
| 2001/0005406 A1 | 6/2001 | Mege et al. |
| 2002/0196185 A1 | 12/2002 | Bloy |
| 2003/0025638 A1 | 2/2003 | Apostolos |
| 2003/0062963 A1 | 4/2003 | Aikawa et al. |
| 2004/0003250 A1 | 1/2004 | Kindberg et al. |
| 2004/0038714 A1 | 2/2004 | Rhodes et al. |
| 2004/0229651 A1 | 11/2004 | Hulkkonen et al. |
| 2005/0237265 A1 | 10/2005 | Durham et al. |
| 2005/0282536 A1 | 12/2005 | McClure et al. |
| 2006/0025072 A1 | 2/2006 | Pan |
| 2007/0024514 A1 | 2/2007 | Phillips et al. |
| 2007/0147338 A1 | 6/2007 | Chandra et al. |
| 2007/0184828 A1 | 8/2007 | Majidi-Ahy |
| 2007/0202931 A1 | 8/2007 | Lee et al. |
| 2008/0039012 A1 | 2/2008 | McKay et al. |
| 2008/0049649 A1 | 2/2008 | Kozisek et al. |
| 2008/0181328 A1 | 7/2008 | Harel et al. |
| 2009/0153407 A1 | 6/2009 | Zhang et al. |
| 2009/0176487 A1 | 7/2009 | DeMarco |
| 2009/0207091 A1 | 8/2009 | Anagnostou et al. |
| 2009/0231215 A1 | 9/2009 | Taura |
| 2009/0296938 A1 | 12/2009 | Devanand et al. |
| 2010/0197222 A1 | 8/2010 | Scheucher |
| 2010/0207823 A1 | 8/2010 | Sakata et al. |
| 2010/0248659 A1 | 9/2010 | Kawabata |
| 2010/0302112 A1 | 12/2010 | Lindenmeier et al. |
| 2011/0070824 A1 | 3/2011 | Braithwaite |
| 2011/0199279 A1 | 8/2011 | Shen et al. |
| 2011/0292843 A1 | 12/2011 | Gan et al. |
| 2012/0064841 A1 | 3/2012 | Husted et al. |
| 2012/0094630 A1 | 4/2012 | Wisnewski et al. |
| 2012/0099856 A1 | 4/2012 | Britz et al. |
| 2012/0194399 A1 | 8/2012 | Bily et al. |
| 2013/0059620 A1 | 3/2013 | Cho |
| 2013/0069834 A1 | 3/2013 | Duerksen |
| 2013/0141190 A1 | 6/2013 | Kitaoka et al. |
| 2013/0231066 A1 | 9/2013 | Zander et al. |
| 2013/0303145 A1 | 11/2013 | Harrang et al. |
| 2013/0324076 A1 | 12/2013 | Harrang |
| 2014/0094217 A1 | 4/2014 | Stafford |
| 2014/0171811 A1 | 6/2014 | Lin et al. |
| 2014/0198684 A1 | 7/2014 | Gravely et al. |
| 2014/0266946 A1 | 9/2014 | Bily et al. |
| 2014/0269417 A1 | 9/2014 | Yu et al. |
| 2014/0293904 A1 | 10/2014 | Dai et al. |
| 2014/0308962 A1 | 10/2014 | Zhang et al. |
| 2014/0349696 A1 | 11/2014 | Hyde et al. |
| 2015/0109178 A1 | 4/2015 | Hyde et al. |
| 2015/0109181 A1 | 4/2015 | Hyde et al. |
| 2015/0116153 A1 | 4/2015 | Chen et al. |
| 2015/0131618 A1 | 5/2015 | Chen |
| 2015/0162658 A1 | 6/2015 | Bowers et al. |
| 2015/0222021 A1 | 8/2015 | Stevenson et al. |
| 2015/0229028 A1 | 8/2015 | Bily et al. |
| 2015/0236777 A1 | 8/2015 | Akhtar et al. |
| 2015/0276926 A1 | 10/2015 | Bowers et al. |
| 2015/0276928 A1 | 10/2015 | Bowers et al. |
| 2015/0288063 A1 | 10/2015 | Johnson et al. |
| 2015/0318618 A1 | 11/2015 | Chen et al. |
| 2015/0372389 A1 | 12/2015 | Chen et al. |
| 2016/0037508 A1 | 2/2016 | Sun |
| 2016/0079672 A1 | 3/2016 | Cerreno |
| 2016/0087334 A1 | 3/2016 | Sayama et al. |
| 2016/0149308 A1 | 5/2016 | Chen et al. |
| 2016/0149309 A1 | 5/2016 | Chen et al. |
| 2016/0149310 A1 | 5/2016 | Chen et al. |
| 2016/0164175 A1 | 6/2016 | Chen et al. |
| 2016/0174241 A1 | 6/2016 | Ansari et al. |
| 2016/0198334 A1 | 7/2016 | Bakshi et al. |
| 2016/0219539 A1 | 7/2016 | Kim et al. |
| 2016/0241367 A1 | 8/2016 | Irmer et al. |
| 2016/0269964 A1 | 9/2016 | Murray |
| 2016/0302208 A1 | 10/2016 | Sturkovich et al. |
| 2016/0345221 A1 | 11/2016 | Axmon et al. |
| 2016/0365754 A1 | 12/2016 | Zeine et al. |
| 2016/0373181 A1 | 12/2016 | Black et al. |
| 2017/0085357 A1 | 3/2017 | Shahar |
| 2017/0118750 A1 | 4/2017 | Kikuma et al. |
| 2017/0127295 A1 | 5/2017 | Black et al. |
| 2017/0127296 A1 | 5/2017 | Gustafsson et al. |
| 2017/0127332 A1 | 5/2017 | Axmon et al. |
| 2017/0155192 A1 | 6/2017 | Black et al. |
| 2017/0155193 A1 | 6/2017 | Black et al. |
| 2017/0187123 A1 | 6/2017 | Black et al. |
| 2017/0187426 A1 | 6/2017 | Su et al. |
| 2017/0194704 A1 | 7/2017 | Chawgo et al. |
| 2017/0195054 A1 | 7/2017 | Ashrafi |
| 2017/0238141 A1 | 8/2017 | Lindoff et al. |
| 2017/0310017 A1 | 10/2017 | Howard |

(56) References Cited

U.S. PATENT DOCUMENTS

| | | |
|---|---|---|
| 2017/0339575 A1 | 11/2017 | Kim et al. |
| 2017/0367053 A1 | 12/2017 | Noh et al. |
| 2017/0373403 A1 | 12/2017 | Watson |
| 2018/0013193 A1 | 1/2018 | Olsen et al. |
| 2018/0019798 A1 | 1/2018 | Khan et al. |
| 2018/0027555 A1 | 1/2018 | Kim et al. |
| 2018/0066991 A1 | 3/2018 | Mueller et al. |
| 2018/0097286 A1 | 4/2018 | Black et al. |
| 2018/0123692 A1 | 5/2018 | Leiba |
| 2018/0177461 A1 | 6/2018 | Bell et al. |
| 2018/0219283 A1 | 8/2018 | Wilkins et al. |
| 2018/0227035 A1 | 8/2018 | Cheng et al. |
| 2018/0227445 A1 | 8/2018 | Minegishi |
| 2018/0233821 A1 | 8/2018 | Pham et al. |
| 2018/0270729 A1 | 9/2018 | Ramachandra et al. |
| 2018/0301821 A1 | 10/2018 | Black et al. |
| 2018/0337445 A1 | 11/2018 | Sullivan et al. |
| 2018/0368389 A1 | 12/2018 | Adams |
| 2019/0020107 A1 | 1/2019 | Polehn et al. |
| 2019/0052428 A1 | 2/2019 | Chu et al. |
| 2019/0053013 A1 | 2/2019 | Markhovsky et al. |
| 2019/0067813 A1 | 2/2019 | Igura |
| 2019/0219982 A1 | 7/2019 | Klassen et al. |
| 2019/0221931 A1 | 7/2019 | Black et al. |
| 2019/0289482 A1 | 9/2019 | Black |
| 2019/0289560 A1 | 9/2019 | Black et al. |
| 2019/0336107 A1 | 11/2019 | Hope Simpson et al. |
| 2019/0372671 A1 | 12/2019 | Ashrafi |
| 2020/0008163 A1 | 1/2020 | Black et al. |
| 2020/0036413 A1 | 1/2020 | Deutsch et al. |
| 2020/0083605 A1 | 3/2020 | Quarfoth et al. |
| 2020/0083960 A1 | 3/2020 | Ashrafi |
| 2020/0091607 A1 | 3/2020 | Black et al. |
| 2020/0137698 A1 | 4/2020 | Black et al. |
| 2020/0186227 A1 | 6/2020 | Reider et al. |
| 2020/0205012 A1 | 6/2020 | Bengtsson et al. |
| 2020/0251802 A1 | 8/2020 | Katko et al. |
| 2020/0259552 A1 | 8/2020 | Ashworth |
| 2020/0266533 A1 | 8/2020 | McCandless et al. |
| 2020/0313741 A1 | 10/2020 | Zhu et al. |
| 2020/0366363 A1 | 11/2020 | Li et al. |
| 2020/0403689 A1 | 12/2020 | Rofougaran et al. |
| 2021/0036437 A1 | 2/2021 | Zhang et al. |
| 2021/0067237 A1 | 3/2021 | Sampath et al. |
| 2021/0159945 A1 | 5/2021 | Deutsch et al. |
| 2021/0167819 A1 | 6/2021 | Deutsch et al. |
| 2021/0176719 A1 | 6/2021 | Black et al. |
| 2021/0185623 A1 | 6/2021 | Black et al. |
| 2021/0234591 A1 | 7/2021 | Eleftheriadis et al. |
| 2021/0313677 A1 | 10/2021 | McCandless et al. |
| 2021/0328366 A1 | 10/2021 | McCandless et al. |
| 2021/0328664 A1 | 10/2021 | Schwab et al. |
| 2021/0367684 A1 | 11/2021 | Bendinelli et al. |
| 2021/0368355 A1 | 11/2021 | Liu et al. |
| 2021/0376912 A1 | 12/2021 | Black et al. |
| 2022/0014933 A1 | 1/2022 | Moon et al. |
| 2022/0038858 A1 | 2/2022 | Rea |
| 2022/0053433 A1 | 2/2022 | Abedini et al. |
| 2022/0078762 A1 | 3/2022 | Machado et al. |
| 2022/0085498 A1 | 3/2022 | Mason et al. |
| 2022/0085869 A1 | 3/2022 | Black et al. |
| 2022/0102828 A1 | 3/2022 | Katko et al. |
| 2022/0232396 A1 | 7/2022 | Cavcic et al. |
| 2022/0240305 A1 | 7/2022 | Black et al. |
| 2022/0302992 A1 | 9/2022 | Sivaprakasam et al. |
| 2022/0369295 A1 | 11/2022 | Machado et al. |
| 2023/0011531 A1 | 1/2023 | Black |
| 2023/0126395 A1 | 4/2023 | McCandless et al. |
| 2023/0155666 A1 | 5/2023 | Black et al. |
| 2023/0164796 A1 | 5/2023 | Black et al. |

FOREIGN PATENT DOCUMENTS

| | | |
|---|---|---|
| CA | 3092509 A1 | 9/2019 |
| CN | 102948089 A | 2/2013 |
| CN | 103700951 A | 4/2014 |
| CN | 106572622 A | 4/2017 |
| CN | 106664124 A | 5/2017 |
| CN | 106797074 A | 5/2017 |
| CN | 109478900 A | 3/2019 |
| CN | 110034416 A | 7/2019 |
| CN | 110521277 A | 11/2019 |
| CN | 111903063 A | 11/2020 |
| EP | 3440778 A1 | 10/2017 |
| EP | 3273629 A1 | 1/2018 |
| EP | 3603329 A1 | 9/2018 |
| EP | 3769429 A1 | 9/2019 |
| EP | 3831115 A1 | 2/2020 |
| EP | 3928380 A1 | 8/2020 |
| EP | 4085494 A1 | 7/2021 |
| EP | 4136759 A1 | 10/2021 |
| EP | 4158796 A1 | 12/2021 |
| JP | S61-1102 A | 1/1986 |
| JP | H09-36656 A | 2/1997 |
| JP | H09-214418 A | 8/1997 |
| JP | 2000-111630 A | 4/2000 |
| JP | 3307146 B2 | 7/2002 |
| JP | 2004-270143 A | 9/2004 |
| JP | 3600459 B2 | 12/2004 |
| JP | 2007-81648 A | 3/2007 |
| JP | 2007-306273 A | 11/2007 |
| JP | 2008-153798 A | 7/2008 |
| JP | 2009-514329 A | 4/2009 |
| JP | 2010-226457 A | 10/2010 |
| JP | 2011-507367 A | 3/2011 |
| JP | 2011-508994 A | 3/2011 |
| JP | 2012-175189 A | 9/2012 |
| JP | 2013-539949 A | 10/2013 |
| JP | 2014-075788 A | 4/2014 |
| JP | 2014-207626 A | 10/2014 |
| JP | 2014-531826 A | 11/2014 |
| JP | 2016-139965 A | 8/2016 |
| JP | 2017-220825 A | 12/2017 |
| JP | 2018-14713 A | 1/2018 |
| JP | 2018-173921 A | 11/2018 |
| JP | 2019-518355 A | 6/2019 |
| JP | 2020-515162 A | 5/2020 |
| JP | 2020-523863 A | 8/2020 |
| JP | 2020-145614 A | 9/2020 |
| JP | 2021-517406 A | 7/2021 |
| JP | 2021-532683 A | 11/2021 |
| JP | 2022-521286 A | 4/2022 |
| JP | 2023-519067 A | 5/2023 |
| JP | 2023-522640 A | 5/2023 |
| JP | 2023-527384 A | 6/2023 |
| KR | 10-2006-0031895 A | 4/2006 |
| KR | 10-2008-0093257 A | 10/2008 |
| KR | 10-2016-0072062 A | 6/2016 |
| KR | 10-2016-0113100 A | 9/2016 |
| KR | 10 2016 0113100 A | 9/2016 |
| KR | 10-2019-0010545 A | 1/2019 |
| KR | 10-2019-0133194 A | 12/2019 |
| KR | 10-2020-0123254 A | 10/2020 |
| KR | 10-2021-0048499 A | 5/2021 |
| KR | 10-2021-0125579 A | 10/2021 |
| KR | 10-2022-0129570 A | 9/2022 |
| KR | 10-2023-0009895 A | 1/2023 |
| KR | 10-2023-0017280 A | 2/2023 |
| TW | 02037208 A * | 10/2020 |
| WO | 2007001134 A1 | 1/2007 |
| WO | 2010104435 A1 | 9/2010 |
| WO | 2012050614 A1 | 4/2012 |
| WO | 2012096611 A2 | 7/2012 |
| WO | 2012161612 A1 | 11/2012 |
| WO | 2013023171 A1 | 2/2013 |
| WO | 2015196044 A1 | 12/2015 |
| WO | 2016044069 A1 | 3/2016 |
| WO | 2017008851 A1 | 1/2017 |
| WO | 2017014842 A1 | 1/2017 |
| WO | 2017/176746 A1 | 10/2017 |
| WO | 2017193056 A1 | 11/2017 |
| WO | 2018144940 A1 | 8/2018 |
| WO | 2018/175615 A1 | 9/2018 |
| WO | 2018179870 A1 | 10/2018 |

(56) References Cited

FOREIGN PATENT DOCUMENTS

| WO | 2019/139745 A1 | 7/2019 |
|---|---|---|
| WO | 2019/183072 A1 | 9/2019 |
| WO | 2019/183107 A1 | 9/2019 |
| WO | 2020/027990 A1 | 2/2020 |
| WO | 2020/060705 A1 | 3/2020 |
| WO | 2020/076350 A1 | 4/2020 |
| WO | 2020095597 A1 | 5/2020 |
| WO | 2020/163052 A1 | 8/2020 |
| WO | 2020/171947 A1 | 8/2020 |
| WO | 2021003112 A1 | 1/2021 |
| WO | 2021/137898 A1 | 7/2021 |
| WO | 2021/211354 A1 | 10/2021 |
| WO | 2021/242996 A1 | 12/2021 |
| WO | 2022/031477 A1 | 2/2022 |
| WO | 2022/056024 A1 | 3/2022 |
| WO | 2022/155529 A1 | 7/2022 |
| WO | 2022/164930 A1 | 8/2022 |
| WO | 2023/283352 A1 | 1/2023 |
| WO | 2023/076405 A1 | 5/2023 |

OTHER PUBLICATIONS

Office Communication for U.S. Appl. No. 17/891,970 dated Jun. 16, 2023, pp. 1-11.
Office Communication for U.S. Appl. No. 17/397,442 dated Jun. 23, 2023, pp. 1-15.
Office Communication for U.S. Appl. No. 17/980,391 dated Jul. 3, 2023, pp. 1-9.
Office Communication for Japanese Patent Application No. JP 2020-548724 dated Jun. 15, 2023, pp. 1-5.
International Search Report and Written Opinion for International Patent Application No. PCT/US2023/018993 dated Jun. 27, 2023, pp. 1-9.
Office Communication for U.S. Appl. No. 17/576,832 dated Jul. 13, 2023, pp. 1-4.
Cheng et al., "Real-time two-dimensional beam steering with gate-tunable materials: a theoretical investigation", Applied Optics, vol. 55, No. 22, Aug. 1, 2016, pp. 6137-6144.
Wolf et al., "Phased-Array Sources Based on Nonlinear Metamaterial Nanocavities", Nature Communications, vol. 6, 7667, 2015 Macmillan Publishers Limited, pp. 1-6.
Examination Report for European Patent Application No. 19772471.9 dated Jul. 28, 2023, pp. 1-4.
Examination Report No. 1 for Australian Patent Application No. 2019239864, dated Jul. 7, 2022, pp. 1-3.
Intention to Grant for European Patent Application No. 20759272.6 dated Sep. 19, 2023, 11 pages.
International Preliminary Report on Patentability Chapter 1 for International Patent Application No. PCT/US2018/066329 dated Jul. 23, 2020, pp. 1-7.
International Preliminary Report on Patentability Chapter I for International Patent Application No. PCT/US2019/022987 dated Oct. 1, 2020, pp. 1-9.
International Preliminary Report on Patentability Chapter I for International Patent Application No. PCT/US2019/041053 dated Feb. 11, 2021, pp. 1-6.
International Preliminary Report on Patentability Chapter I for International Patent Application No. PCT/US2019/047093 dated Apr. 1, 2021, pp. 1-5.
International Preliminary Report on Patentability Chapter I for International Patent Application No. PCT/US2020/013713 dated Aug. 19, 2021, pp. 1-6.
International Preliminary Report on Patentability Chapter I for International Patent Application No. PCT/US2020/016641 dated Sep. 2, 2021, pp. 1-5.
International Preliminary Report on Patentability Chapter I for International Patent Application No. PCT/US2020/048806 dated Jul. 14, 2022, pp. 1-7.
International Preliminary Report on Patentability Chapter I for International Patent Application No. PCT/US2021/034479 dated Dec. 8, 2022, pp. 1-5.
International Preliminary Report on Patentability Chapter I for International Patent Application No. PCT/US2021/043308 dated Feb. 16, 2023, pp. 1-6.
International Preliminary Report on Patentability Chapter I for International Patent Application No. PCT/US2021/049502 dated Mar. 23, 2023, pp. 1-6.
International Preliminary Report on Patentability Chapter I for International Patent Application No. PCT/US2022/012613 dated Jul. 27, 2023, pp. 1-6.
International Preliminary Report on Patentability Chapter I for International Patent Application No. PCT/US2022/013942 dated Aug. 10, 2023, pp. 1-6.
International Preliminary Report on Patentability Chapter I for International Patent Application No. PCT/US2021/026400 dated Oct. 27, 2022, pp. 1-5.
International Preliminary Report on Patentability for International Patent Application No. PCT/US2019/022942 dated Oct. 1, 2020, pp. 1-8.
International Search Report and Written Opinion for International Patent Application No. PCT/US2018/066329 dated May 31, 2019, pp. 1-8.
Notice of Acceptance for Australian Patent Application No. 2019239864 dated Jan. 16, 2023, pp. 1-3.
Office Action for Korean Patent Application No. KR 10-2020-7029161 dated Jul. 19, 2023, pp. 1-16 including English translation.
Office Communication for U.S. Appl. No. 15/870,758 dated Apr. 16, 2019, pp. 1-10.
Office Communication for U.S. Appl. No. 15/925,612 dated Dec. 19, 2018, pp. 1-12.
Office Communication for U.S. Appl. No. 16/049,630 dated Feb. 18, 2020, pp. 1-5.
Office Communication for U.S. Appl. No. 16/730,690 dated Apr. 21, 2021, pp. 1-2.
Office Communication for U.S. Appl. No. 16/846,670 dated Apr. 21, 2021, pp. 1-2.
Office Communication for U.S. Appl. No. 17/203,255 dated May 5, 2022, pp. 1-2.
Office Communication for U.S. Appl. No. 17/334,105 dated Aug. 11, 2023, pp. 1-16.
Office Communication for U.S. Appl. No. 17/397,442 dated Sep. 8, 2023, pp. 1-16.
Office Communication for U.S. Appl. No. 17/576,832 dated Aug. 16, 2023, pp. 1-7.
Office Communication for U.S. Appl. No. 17/576,832 dated Aug. 24, 2023, pp. 1-4.
Office Communication for U.S. Appl. No. 17/708,757 dated Aug. 4, 2023, pp. 1-8.
Office Communication for U.S. Appl. No. 17/859,632 dated Aug. 8, 2023, pp. 1-14.
Office Communication for U.S. Appl. No. 17/891,970 dated Sep. 25, 2023, pp. 1-8.
Search Report for Chinese Patent Application No. 201980019925.1 dated Sep. 19, 2021, pp. 1-2.
U.S. Appl. No. 62/743,672, filed Oct. 10, 2018, pp. 1-278.
Office Communication for U.S. Appl. No. 15/925,612 dated Jun. 15, 2018, pp. 1-9.
U.S. Appl. No. 14/510,947, filed Oct. 9, 2014, pp. 1-76.
Office Communication for U.S. Appl. No. 16/049,630 dated Oct. 4, 2018, pp. 1-13.
Office Communication for U.S. Appl. No. 15/870,758 dated Oct. 1, 2018, pp. 1-12.
Office Communication for U.S. Appl. No. 16/136,119 dated Nov. 23, 2018, pp. 1-12.
Office Communication for U.S. Appl. No. 16/136,119 dated Mar. 15, 2019, pp. 1-8.
Office Communication for U.S. Appl. No. 16/292,022 dated Jun. 7, 2019, pp. 1-13.
Office Communication for U.S. Appl. No. 16/049,630 dated Apr. 12, 2019, pp. 1-13.

(56) References Cited

OTHER PUBLICATIONS

Office Communication for U.S. Appl. No. 16/268,469 dated May 16, 2019, pp. 1-16.
Office Communication for U.S. Appl. No. 16/280,939 dated May 13, 2019, pp. 1-22.
Office Communication for U.S. Appl. No. 16/440,815 dated Jul. 17, 2019, pp. 1-16.
Office Communication for U.S. Appl. No. 16/358,112 dated May 15, 2019, pp. 1-17.
International Search Report and Written Opinion for International Patent Application No. PCT/US2019/022942 dated Jul. 4, 2019, pp. 1-12.
Yurduseven, Okan et al., "Dual-Polarization Printed Holographic Multibeam Metasurface Antenna" Aug. 7, 2017, IEEE Antennas and Wireless Propagation Letters. pp. 10.1109/LAWP.2017, pp. 1-4.
International Search Report and Written Opinion for International Patent Application No. PCT/US2019/022987 dated Jul. 2, 2019, pp. 1-13.
Office Communication for U.S. Appl. No. 16/049,630 dated Jun. 24, 2019, pp. 1-5.
Office Communication for U.S. Appl. No. 16/280,939 dated Jul. 18, 2019, pp. 1-7.
Office Communication for U.S. Appl. No. 16/049,630 dated Aug. 7, 2019, pp. 1-13.
Office Communication for U.S. Appl. No. 16/292,022 dated Sep. 23, 2019, pp. 1-9.
Office Communication for U.S. Appl. No. 16/440,815 dated Oct. 7, 2019, pp. 1-5.
Office Communication for U.S. Appl. No. 16/268,469 dated Sep. 10, 2019, pp. 1-11.
International Search Report and Written Opinion for International Patent Application No. PCT/US2019/041053 dated Aug. 27, 2019, pp. 1-8.
Office Communication for U.S. Appl. No. 16/568,096 dated Oct. 24, 2019, pp. 1-10.
International Search Report and Written Opinion for International Patent Application No. PCT/US2019/047093 dated Oct. 21, 2019, pp. 1-7.
Office Communication for U.S. Appl. No. 16/049,630 dated Dec. 9, 2019, pp. 1-13.
Office Communication for U.S. Appl. No. 16/440,815 dated Jan. 8, 2020, pp. 1-8.
Office Communication for U.S. Appl. No. 16/730,932 dated Mar. 6, 2020, pp. 1-13.
Office Communication for U.S. Appl. No. 16/049,630 dated Mar. 31, 2020, pp. 1-15.
Office Communication for U.S. Appl. No. 16/734,195 dated Mar. 20, 2020, pp. 1-8.
Office Communication for U.S. Appl. No. 16/846,670 dated Jun. 11, 2020, pp. 1-12.
Office Communication for U.S. Appl. No. 16/673,852 dated Jun. 24, 2020, pp. 1-11.
International Search Report and Written Opinion for International Patent Application No. PCT/US2020/016641 dated Apr. 14, 2020, pp. 1-7.
Gao, S.S. et al., "Holographic Artificial Impedance Surface Antenna Based on Circular Patch", 2018 International Conference on Microwave and Millimeter Wave Technology (ICMMT), 2018, pp. 1-3.
Nishiyama, Eisuke et al., "Polarization Controllable Microstrip Antenna using Beam Lead PIN Diodes", 2006 Asia-Pacific Microwave Conference, 2006, pp. 1-4.
International Search Report and Written Opinion for International Patent Application No. PCT/US2020/013713 dated Apr. 21, 2020, pp. 1-8.
Office Communication for U.S. Appl. No. 16/049,630 dated Aug. 19, 2020, pp. 1-18.
Office Communication for U.S. Appl. No. 16/730,932 dated Aug. 25, 2020, pp. 1-5.
Office Communication for U.S. Appl. No. 16/983,927 dated Aug. 31, 2020, pp. 1-7.
Office Communication for U.S. Appl. No. 16/983,978 dated Sep. 16, 2020, pp. 1-7.
Office Communication for U.S. Appl. No. 16/049,630 dated Oct. 15, 2020, pp. 1-16.
Office Communication for U.S. Appl. No. 16/983,978 dated Oct. 27, 2020, pp. 1-13.
International Search Report and Written Opinion for International Patent Application No. PCT/US2020/048806 dated Nov. 17, 2020, pp. 1-9.
Office Communication for U.S. Appl. No. 16/673,852 dated Nov. 25, 2020, pp. 1-8.
Office Communication for U.S. Appl. No. 16/846,670 dated Nov. 25, 2020, pp. 1-13.
Office Communication for U.S. Appl. No. 16/983,927 dated Jan. 6, 2021, pp. 1-8.
Office Communication for U.S. Appl. No. 16/846,670 dated Feb. 8, 2021, pp. 1-4.
Office Communication for U.S. Appl. No. 16/983,978 dated Feb. 10, 2021, pp. 1-11.
Office Communication for U.S. Appl. No. 16/846,670 dated Apr. 2, 2021, pp. 1-9.
Office Communication for U.S. Appl. No. 16/730,690 dated Apr. 8, 2021, pp. 1-11.
Office Communication for U.S. Appl. No. 17/177,131 dated Apr. 9, 2021, pp. 1-17.
Vu, Trung Kien et al., "Joint Load Balancing and Interference Mitigation in 5G Heterogeneous Networks," IEEE Transactions on Wireless Communications, 2017, vol. 16, No. 9, pp. 6032-6046.
Office Communication for U.S. Appl. No. 17/177,145 dated Apr. 19, 2021, pp. 1-11.
Office Communication for U.S. Appl. No. 17/112,940 dated Jul. 21, 2021, pp. 1-22.
International Search Report and Written Opinion for International Patent Application No. PCT/US2021/026400 dated Jul. 20, 2021, pp. 1-7.
Office Communication for U.S. Appl. No. 17/177,145 dated Aug. 3, 2021, pp. 1-16.
Office Communication for U.S. Appl. No. 17/177,131 dated Aug. 6, 2021, pp. 1-16.
Office Communication for U.S. Appl. No. 17/112,940 dated Aug. 9, 2021, pp. 1-20.
International Search Report and Written Opinion for International Patent Application No. PCT/US2021/034479 dated Aug. 10, 2021, pp. 1-7.
Office Communication for U.S. Appl. No. 17/332,136 dated Sep. 2, 2021, pp. 1-9.
Office Communication for Chinese Patent Application No. 201980019925.1 dated Sep. 27, 2021, pp. 1-25.
Office Communication for U.S. Appl. No. 17/177,145 dated Oct. 14, 2021, pp. 1-5.
International Search Report and Written Opinion for International Patent Application No. PCT/US2021/043308 dated Nov. 2, 2021, pp. 1-8.
Office Communication for U.S. Appl. No. 17/177,131 dated Nov. 12, 2021, pp. 1-5.
Extended European Search Report for European Patent Application No. 19772471.9 dated Nov. 8, 2021, pp. 1-8.
Office Communication for U.S. Appl. No. 17/177,145 dated Nov. 16, 2021, pp. 1-16.
Office Communication for U.S. Appl. No. 17/177,131 dated Dec. 17, 2021, pp. 1-14.
Black, Eric J., "Holographic Beam Forming and MIMO," Pivotal Commware, 2017, pp. 1-8.
Björn, Ekman, "Machine Learning for Beam Based Mobility Optimization in NR," Master of Science Thesis in Communication Systems, Department of Electrical Engineering, Linköping University, 2017, pp. 1-85.
Office Communication for U.S. Appl. No. 17/112,940 dated Dec. 22, 2021, pp. 1-15.
International Search Report and Written Opinion for International Patent Application No. PCT/US2021/049502 dated Dec. 14, 2021, pp. 1-8.

(56) References Cited

OTHER PUBLICATIONS

Office Communication for U.S. Appl. No. 17/469,694 dated Jan. 20, 2022, pp. 1-9.
Office Communication for U.S. Appl. No. 17/537,233 dated Feb. 4, 2022, pp. 1-9.
Office Communication for U.S. Appl. No. 17/112,940 dated Mar. 17, 2022, pp. 1-16.
Office Communication for U.S. Appl. No. 17/576,832 dated Mar. 18, 2022, pp. 1-15.
Office Communication for U.S. Appl. No. 17/177,145 dated Mar. 24, 2022, pp. 1-18.
Office Communication for U.S. Appl. No. 17/306,361 dated Mar. 28, 2022, pp. 1-7.
Extended European Search Report for European Patent Application No. 19844867.2 dated Mar. 30, 2022, pp. 1-16.
Office Communication for U.S. Appl. No. 17/576,832 dated Apr. 1, 2022, pp. 1-14.
Office Communication for U.S. Appl. No. 17/585,418 dated Apr. 8, 2022, pp. 1-9.
Office Communication for U.S. Appl. No. 17/537,233 dated Apr. 20, 2022, pp. 1-9.
Office Communication for U.S. Appl. No. 17/203,255 dated Apr. 26, 2022, pp. 1-17.
Office Communication for U.S. Appl. No. 17/177,131 dated Apr. 27, 2022, pp. 1-14.
International Search Report and Written Opinion for International Patent Application No. PCT/US2022/012613 dated May 10, 2022, pp. 1-8.
International Search Report and Written Opinion for international Patent Application No. PCT/US2022/013942 dated May 10, 2022, pp. 1-8.
Qualcomm Incorporated, "Common understanding of repeaters," 3GPP TSG RAN WG4 #98_e R4-2102829, 2021, https://www.3gpp.org/ftp/tsg_ran/WG4_Radio/TSGR4_98_e/Docs/R4-2102829.zip, Accessed: May 25, 2022, pp. 1-2.
MediaTek Inc., "General views on NR repeater," 3GPP TSG RAN WG4 #98_e R4-2101156, 2021, https://www.3gpp.org/ftp/tsg_ran/WG4_Radio/TSGR4_98_e/Docs/R4-2101156.zip, Accessed: May 25, 2022, pp. 1-4.
Office Communication for U.S. Appl. No. 17/177,145 dated Jun. 3, 2022, pp. 1-5.
Office Communication for U.S. Appl. No. 17/576,832 dated Jul. 13, 2022, pp. 1-15.
Office Communication for U.S. Appl. No. 17/585,418 dated Jul. 22, 2022, pp. 1-6.
Office Communication for U.S. Appl. No. 17/585,418 dated Aug. 4, 2022, pp. 1-2.
Office Communication for U.S. Appl. No. 17/306,361 dated Sep. 9, 2022, pp. 1-7.
Office Communication for U.S. Appl. No. 17/576,832 dated Sep. 23, 2022, pp. 1-5.
Office Communication for U.S. Appl. No. 17/306,361 dated Sep. 27, 2022, pp. 1-7.
Office Communication for U.S. Appl. No. 17/379,813 dated Oct. 5, 2022, pp. 1-11.
Office Communication for U.S. Appl. No. 17/217,882 dated Oct. 13, 2022, pp. 1-14.
Office Communication for U.S. Appl. No. 17/397,442 dated Oct. 27, 2022, pp. 1-8.
Office Communication for U.S. Appl. No. 17/859,632 dated Oct. 27, 2022, pp. 1-12.
International Search Report and Written Opinion for International Patent Application No. PCT/US2022/036381 dated Oct. 25, 2022, pp. 1-8.
Extended European Search Report for European Patent Application No. 20759272.6 dated Nov. 3, 2022, pp. 1-9.
Office Communication for U.S. Appl. No. 17/334,105 dated Nov. 30, 2022, pp. 1-7.
Office Communication for U.S. Appl. No. 17/576,832 dated Dec. 15, 2022, pp. 1-15.
Falconer, David D. et al., "Coverage Enhancement Methods for LMDS," IEEE Communications Magazine, Jul. 2003, vol. 41, Iss. 7, pp. 86-92.
Office Communication for U.S. Appl. No. 17/708,757 dated Jan. 20, 2023, pp. 1-5.
Office Communication for U.S. Appl. No. 17/379,813 dated Feb. 3, 2023, pp. 1-10.
Office Communication for U.S. Appl. No. 17/112,895 dated Feb. 6, 2023, pp. 1-8.
Office Communication for U.S. Appl. No. 17/379,813 dated Feb. 15, 2023, pp. 1-3.
Office Communication for U.S. Appl. No. 17/859,632 dated Feb. 28, 2023, pp. 1-13.
International Search Report and Written Opinion for International Patent Application No. PCT/US2022/047909 dated Feb. 21, 2023, pp. 1-7.
Office Communication for Japanese Patent Application No. JP 2020-548724 dated Mar. 8, 2023, pp. 1-9.
Shimura, Tatsuhiro et al., "A study of indoor area expansion by quasi-millimeter wave repeater," The Collection of Lecture Articles of the 2018 IEICE General Conference, Mar. 2018, pp. 1-5.
Office Communication for U.S. Appl. No. 17/576,832 dated Apr. 28, 2023, pp. 1-15.
Office Communication for U.S. Appl. No. 17/217,882 dated May 15, 2023, pp. 1-6.
Office Communication for U.S. Appl. No. 17/859,632 dated May 16, 2023, pp. 1-4.

\* cited by examiner

TIME-DIVISION-DUPLEX REPEATERS WITH GLOBAL NAVIGATION SATELLITE SYSTEM TIMING RECOVERY

TECHNICAL FIELD

The application has to do with repeaters for wireless communications.

BACKGROUND

Wireless communications, including 5th generation (5G) wireless communications, can be enhanced by placement of repeaters that extend or otherwise amplify the signals from wireless base stations. Repeaters can have several radio frequency (RF) architectures that are viable. One architecture is operation of the repeater in a full duplex mode. In this architecture, there can be four separate antennas for each of the Donor and Service side of the repeater device. These are generally Horizontal-polarization Uplink (H-UL), Vertical-polarization Uplink (V-UL), Horizontal-polarization Downlink (H-DL), and Vertical-polarization Downlink (V-DL). This is a robust architecture in that it is generally immune to changes in the underlying air interface such as Downlink-Uplink (DL-UL) allocation, dynamic slot formats, and flex slots/symbols—all of which are part of the 5G standard from $3^{rd}$ Generation Partnership Project (3GPP).

However, it adds cost compared to other architectures: It can include four Donor unit apertures, generally, as well as a potentially costly set of Monolithic Microwave Integrated Circuit (MIMIC) chains for the conducted RF subsystems. In addition, the RF gain can be limited due to stringent isolation requirements.

Another architecture may use an off-the-shelf or modified user equipment (UE) modem. In this architecture, the modem can recover network synchronization to have knowledge of when the macro-level system is Downlink (DL), Uplink (UL), or even Flex. The modem can then use that information to control the MIMIC chains for the conducted RF subsystems. The conducted RF architecture is then inherently time-division-duplex (TDD), rather than full duplex: it only transmits (and receives) in either DL or UL directions at any instant, rather than both. This improves performance by relaxing isolation requirements. It also reduces the cost allocated to the antennas and (potentially) the MIMIC chains.

However, the cost of the modem can be prohibitively high. The modem itself, as a silicon chip, can be costly. The modem might entail a substantial startup/license cost to the modem supplier, and can be complex to implement and bring up on a Printed Circuit Board (PCB).

A technical problem, therefore, is to realize a repeater that uses a time division duplex (TDD) RF architecture but does not entail the high cost and complexity that come with using a UE modem. This can be accomplished if there is a dedicated timing recovery subsystem. The conventional way to accomplish a timing recovery subsystem is to use custom software running on high-performance silicon, to implement a partial UE modem. This requires frequency conversion from RF to Inphase component and Quadrature component (I/Q) baseband or Intermediate Frequency (IF), at least one high-speed analog to digital converter (ADC), and silicon running appropriate software. There is additional cost and complexity in implementing this solution.

DESCRIPTION OF VARIOUS EMBODIMENTS OF THE INVENTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

The invention is a timing recovery subsystem that utilizes out-of-band communication to synchronize to the desired communications network (e.g., a 5G network). The out-of-band communication can include three pieces of data:

1. A reference to "absolute time", or the synchronized time of the communications network. This can be provided by global navigation satellite system (GNSS) such as Global Positioning System (GPS), Global Navigation Satellite System (GLONASS), or Galileo. In other approaches, the reference to absolute time can be provided by a non-GNSS synchronization protocol such as Institute of Electrical and Electronics Engineers (IEEE) 1588, Synchronous Ethernet (SyncE), or Time Sensitive Networking (TSN).

2. The (locally or globally used) DL and UL pattern of the 5G network within a radio frame. This is also variously known as the TDD pattern, TDD allocation, slot format, and others 3. The start of a radio frame, referenced to "absolute time," of the serving base station/Next Generation NodeB (gNB).

With this information, the timing recovery subsystem can be implemented using a low cost microcontroller. It does not require an Field Programmable Gate Array (FPGA); Digital Signal Processor (DSP); high-speed ADC; or frequency converter from RF to baseband or IF. The microcontroller may make use of the information above to switch the MIMIC chain/RF architecture between DL and UL on a scheduled basis: it knows the absolute time at any instant, it knows the pattern for each radio frame, and it knows when the radio frame starts.

This invention includes delivery of the above information with in-band or out-of-band communication. The information may be gathered in any fashion, from a local Next Generation NodeB (gNB) or higher protocol layer (or the core network). The information is then provided to the timing recovery subsystem of the repeater. Additional information could also be provided to assist with the timing recovery subsystem.

This could be done over a wide variety of interfaces. One possible implementation is to provide the information from a cloud-based management system. Another possible implementation is to provide the information from a device management server over a device management protocol such as Lightweight Machine to Machine (LWM2M), Open Mobile Alliance Device Management (OMA-DM), or Message Queues Telemetry Transport (MQTT). The physical interface could be conducted (as in Ethernet over copper or fiber) or wireless (as in any flavor of Global System for Mobile Communications (GSM), Long Term Evolution (LTE), Bluetooth™, WiFi™, etc). In any case, the interface could also be used to provide other diagnostic information, either to assist the timing recovery subsystem (such as RF power levels) or for general performance diagnostics.

While the following disclosure describes repeater systems with timing recovery, it will be appreciated that the timing recovery aspects that are herein disclosed can also be used in non-repeater contexts. For example, a signal receiver can use the timing recovery described herein to determine when to receive. As another example, a signal transmitter can use the timing recovery described herein to determine when to transmit to either minimize or maximize interference.

Illustrative Repeater Systems

Figure 1:
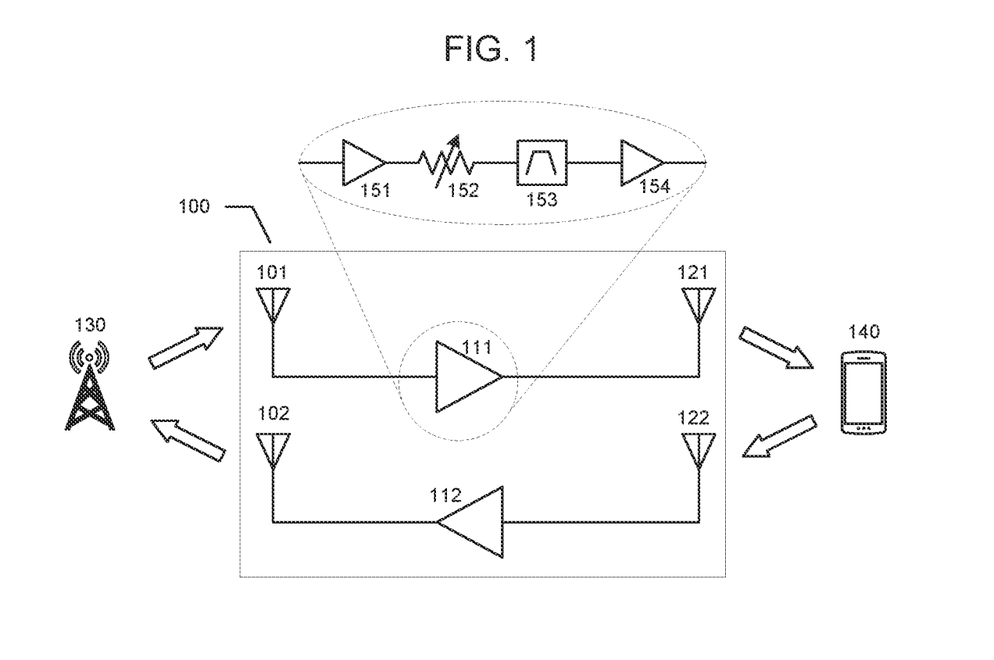
FIG. 1 depicts an example of a full-duplex (FD) repeater system.

With reference now to FIG. 1, an illustrative example of a full duplex wireless repeater 100 is depicted. The repeater includes a donor downlink (DD) antenna 101 that receives downlink RF signals from a wireless base station 130; amplifies the received downlink RF signals with a downlink RF amplifier 111; and retransmits the amplified downlink RF signals to user equipment 140 with a service downlink (SD) antenna 121. The repeater further includes a service uplink (SU) antenna 122 that received uplink RF signals from the user equipment 140; amplifies the received uplink RF signals with an uplink RF amplifier 112; and retransmits the amplified uplink RF signals to the wireless base station 130.

As shown by the zoom in FIG. 1, each of the amplifiers 111 and 112 may consist of an RF amplification chain that can include one or more low noise amplifiers 151, adjustable attenuators 152, band pass filters 153, and power amplifiers 154. The overall amplifier can then be adjusted by, for example, adjusting an attenuator, adjusting a gain of the low noise amplifier and/or power amplifier, turning a low noise amplifier and/or power amplifier on or off, or any combination of these adjustments.

In some approaches, the repeater may repeat RF communications having two orthogonal polarization, e.g., vertical and horizontal. In these approaches, all of the elements of the repeater 100 may be duplicated, with a first set of the elements serving to repeat vertically-polarized RF communications and a second set of the elements serving to repeat horizontally-polarized RF communications. Thus, these dual-polarization repeaters can have as many as eight antennas: four donor antennas communicating with the base station 130 and four service antennas communicating with the user equipment 140.

It can therefore be seen that operating a repeater in full duplex mode can have negative implications in terms of cost, size, and weight of the repeater because of the number of components that are needed to operate in full duplex and dual polarization; and also power consumption because four power amplifiers are consuming energy at the same time; and also mechanical complexity because of the need to provide RF isolation to prevent feedback oscillation. A time-division-duplex repeater avoids these negative implications, but with the added complexity that the TDD repeater needs a timing recovery system to be aware of when to operate in uplink mode and when to operate in downlink mode.

Figure 2A:
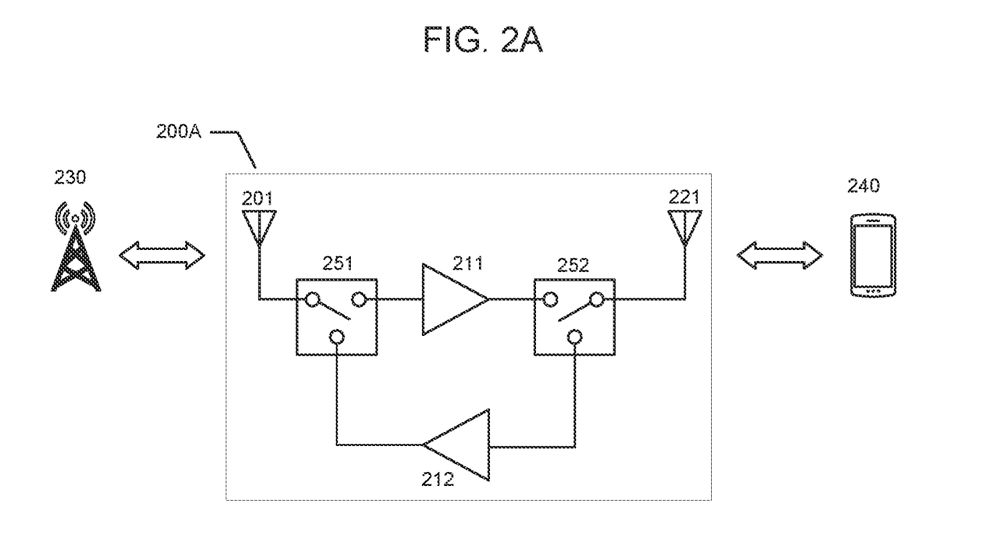
FIGS. 2A-2C depict various examples of time-division-duplex (TDD) repeater systems.
Figure 2B:
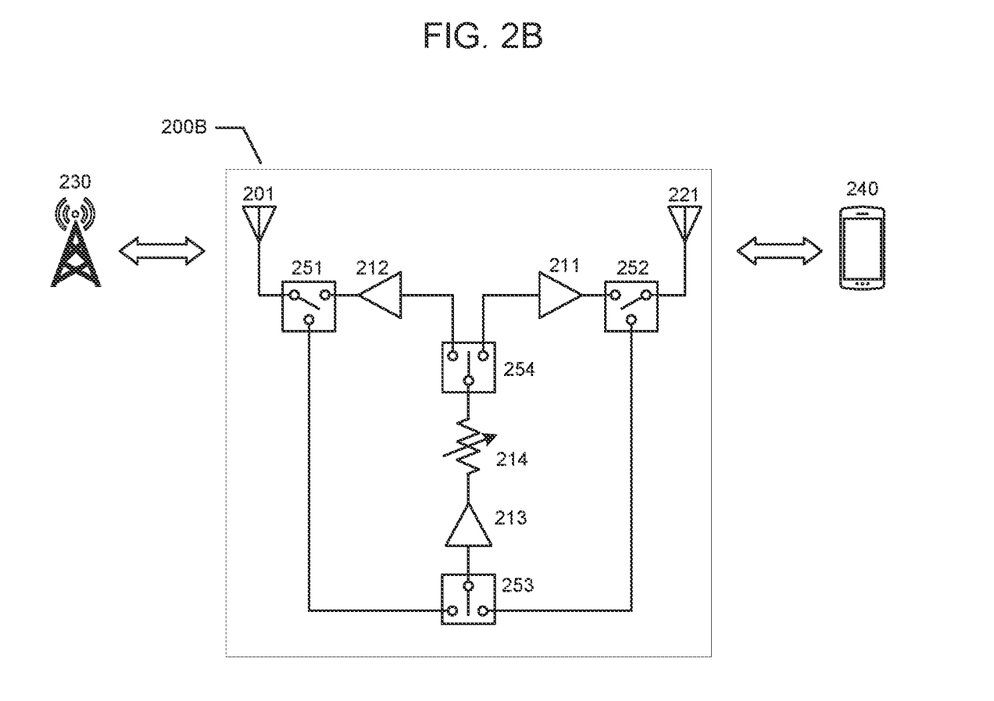
Figure 2C:
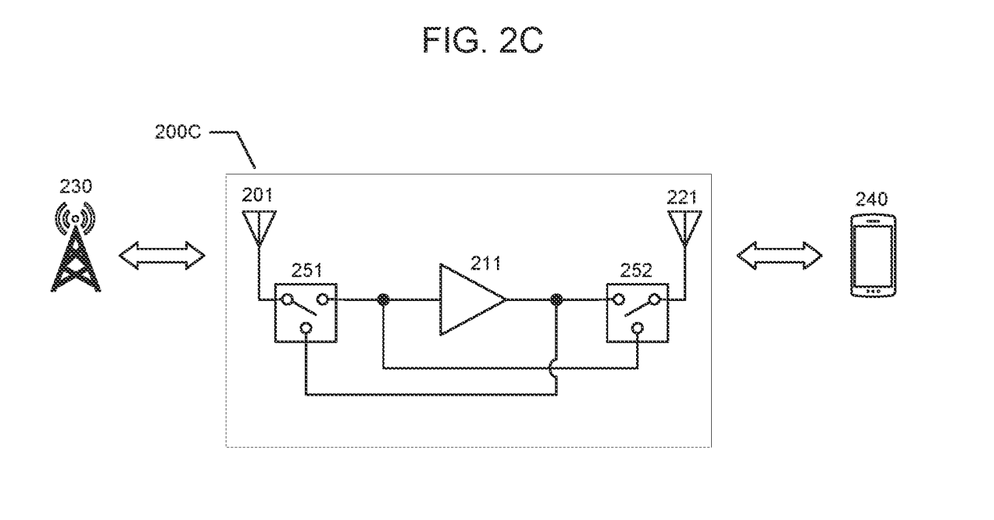

With reference now to FIGS. 2A-2C, illustrative embodiments of TDD wireless repeaters are depicted. In FIG. 2A, repeater 200A includes a donor antenna 201 that transmits RF communications to, or receives RF communications from, a wireless base station 230, depending on whether the repeater is operating in uplink mode or downlink mode, respectively. Repeater 200A further includes a service antenna 221 that transmits RF communications to, or receives RF communications from, user equipment 240, depending on whether the repeater is operating in downlink mode or uplink mode, respectively. Repeater 200A includes a downlink amplifier 211, an uplink amplifier 212, and RF switches 251 and 252 that are operable to switch the repeater between downlink mode and uplink mode.

As with FIG. 1, each amplifier 211, 212 can actually consist of an RF amplification chain consisting of one or more low noise amplifiers, attenuators, band pass filters, and power amplifiers. In some approaches, as illustrated in FIG. 2B, some of these amplifier components can be shared by both uplink and downlink RF amplification chains; in this example, there is a dedicated downlink power amplifier 211 and a dedicated uplink power amplifier 212, but the uplink and downlink amplification chains share a common low noise amplifier 213 and attenuator 214, with RF switches 251, 252, 253, and 254 that are operable to switch the repeater 200B between downlink mode and uplink mode. In other approaches, as illustrated in FIG. 2C, all of the amplifier components can be shared by both uplink and downlink; in this example, there is a single amplifier (or amplifier chain) 211, with RF switches 251 and 252 that are operable to switch the repeater 200C between downlink mode and uplink mode.

The TDD repeaters 200A, 200B, and 200C may repeat RF communications having two orthogonal polarization, e.g., vertical and horizontal. In these approaches, all of the elements of the repeaters 200A, 200B, and 200C may be duplicated, with a first set of the elements serving to repeat vertically-polarized RF communications and a second set of the elements serving to repeat horizontally-polarized RF communications.

Figure 3:
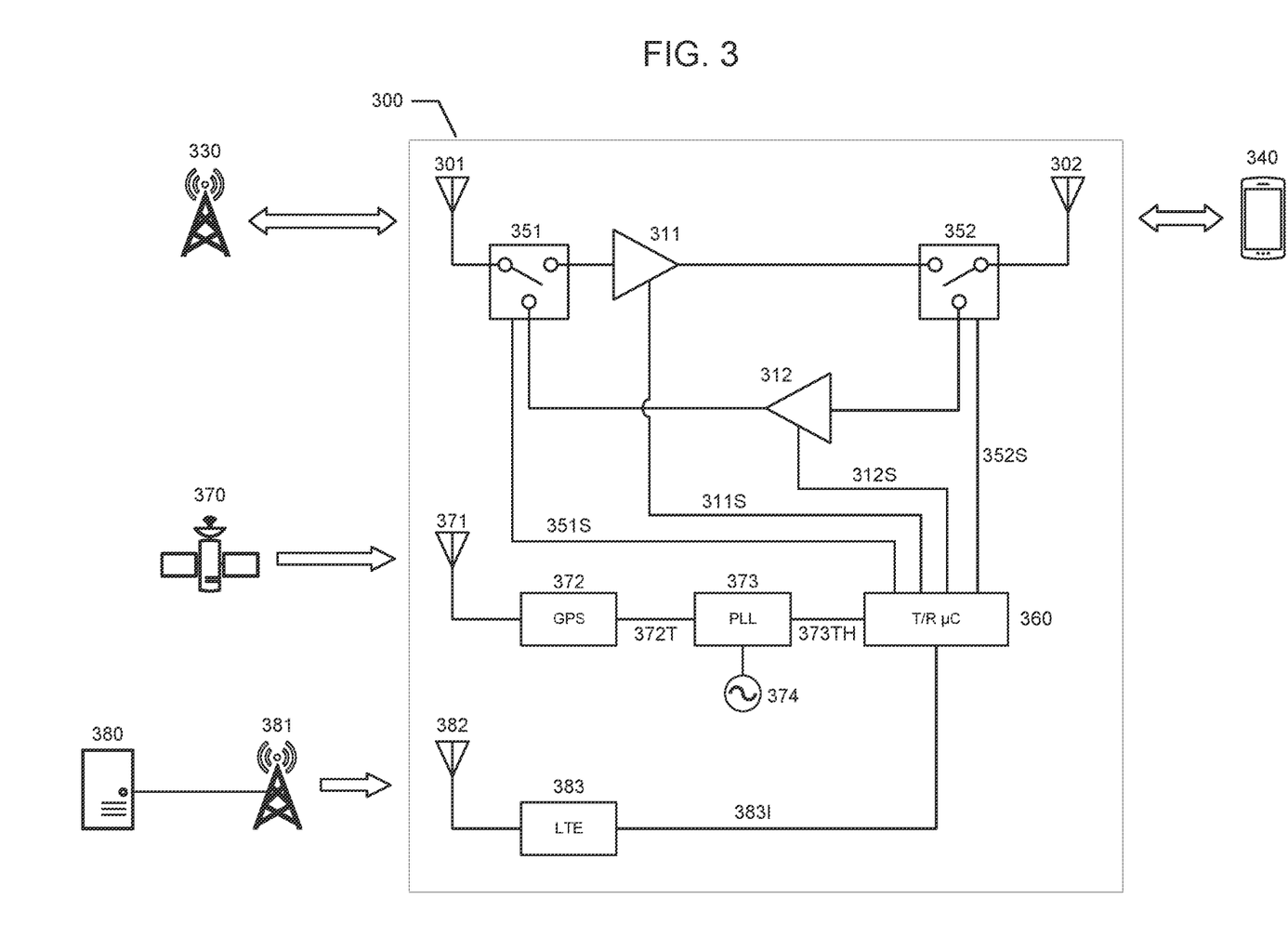
FIG. 3 depicts an example of a TDD repeater system with timing recovery using a Global Navigation Satellite System (GNSS).

With reference now to FIG. 3, an illustrative scenario for timing recovery for a wireless TDD repeater is depicted. In this example, wireless repeater 300 includes a donor antenna 301 for communication with wireless base station 330; a service antenna 302 for communication with user equipment 340; a downlink amplifier 311 that can be switched on or off with control signal 311S; an uplink amplifier 312 that can be switch on or off with control signal 312S; and RF switches 351, 352 that can be toggled with control signals 351S and 351S, respectively.

The repeater includes a timing control unit, such as microcontroller unit 360, which outputs the control signals 311S, 312S, 3351S, and 352S that switch the repeater between uplink mode and downlink mode. The timing control unit can determine a schedule for switching between uplink and downlink based on several inputs.

First, the timing control unit can receive a reference to absolute time for communication on the wireless network. For example, the repeater can include an antenna 371 and receiver 372 operable to receive information from a global navigation satellite system (GNSS) 370 such as Global Positioning System (GPS), Global Navigation Satellite System (GLONASS), or Galileo. The GNSS receiver can output an absolute time reference signal 372T, for example a one-pulse-per-second (1PPS) signal. Signals from a GNSS system can have intermittent outages, e.g., due to satellite flyover/handoff, weather conditions, transient physical obstructions, etc. To accommodate for brief periods of outage, the repeater can include a phase-locked loop (PLL) unit 373 that provides a "holdover" mode with reference to a high quality local oscillator 374, e.g., a crystal oscillator such as a temperature compensated crystal oscillator (TCXO), oven controlled crystal oscillator (OXCO), voltage controlled crystal oscillator (VCXO), or digital controlled crystal oscillator (DCXO). Then, the PLL unit can output an absolute time reference signal 373TH with holdover to the timing control unit 360 to provide reliable timing during the brief periods of GNSS outage. In some approaches, the quality of the timing reference in holdover mode can be improved by applying a correction factor within the microcontroller unit 360, to compensate for any drift in the holdover timing and therefore reduce any phase error between absolute time and the start of a radio frame. For example, user equipment 340 in communication with the repeater can provide key performance indicators (KPIs) as feedback to tune or validate a correction factor that is applied when the PLL is in holdover mode. While the illustrative example of FIG. 3 depicts a repeater that uses signals from a global navigation satellite system (GNSS) to provide a reference to absolute time, in other approaches, the reference to absolute time can be provided by a non-GNSS synchronization protocol such as IEEE 1588, SyncE, or TSN.

Second, the timing control unit can determine a reference to the start time of a radio frame relative to absolute time. In some approaches, the start time is defined, e.g., by a wireless service provider and/or according to a wireless service standard, by adding a selected integer multiple of radio frame lengths to a start time of a coordinated universal time (UTC) second. The reference to the start time of the radio frame can be received in various ways. In the illustrative example of FIG. 3, the repeater includes an LTE antenna 382 and LTE receiver 383, and the information is communicated by a server 380 by way of a wireless base station 381 that communicates with the LTE component, which then relays information 383I to the timing control unit 360. The server 380 could be, for example, a cloud-based management system or a device management server, which might communicate with the repeater via a device management protocol such as LWM2M, OMA-DM, or MQTT. While the illustrative example of FIG. 3 depicts an LTE antenna, the reference to the start time of the radio frame can be received in other ways, for example, via Ethernet, GSM, Bluetooth, WiFi, or similar protocols; or by key-in during installation of the wireless repeater; or by in-band communication using the wireless base station channel 330 instead of a separate out-of-band wireless base station channel 381. In some approaches, the start time of the radio frame can be offset by an over-the-air time-of-flight between the repeater 300 and the wireless base station 330, and information about this time-of-flight value can be received by similar ways as discussed above.

Third, the timing control unit can determine a slot pattern for communication on the wireless network. In some approaches, the slot pattern is defined, e.g., by a wireless service provider and/or according to a wireless service standard. For example, the slot pattern might include four downlink slots followed by one uplink slot, as in the illustrative timing example of FIG. 5, as discussed below. The slot pattern can be received in various ways. In the illustrative example of FIG. 3, the repeater includes an LTE antenna 382 and LTE receiver 383, and the information is communicated by a server 380 by way of a wireless base station 381 that communicates with the LTE component, which then relays information 383I to the timing control unit 360. The server 380 could be, for example, a cloud-based management system or a device management server, which might communicate with the repeater via a device management protocol such as LWM2M, OMA-DM, or MQTT. While the illustrative example of FIG. 3 depicts an LTE antenna, the slot pattern can be received in other ways, for example, via Ethernet, GSM, Bluetooth, WiFi, or similar protocols; or by key-in during installation of the wireless repeater; or by in-band communication using the wireless base station channel 330 instead of a separate out-of-band wireless base station channel 381.

Figure 4:
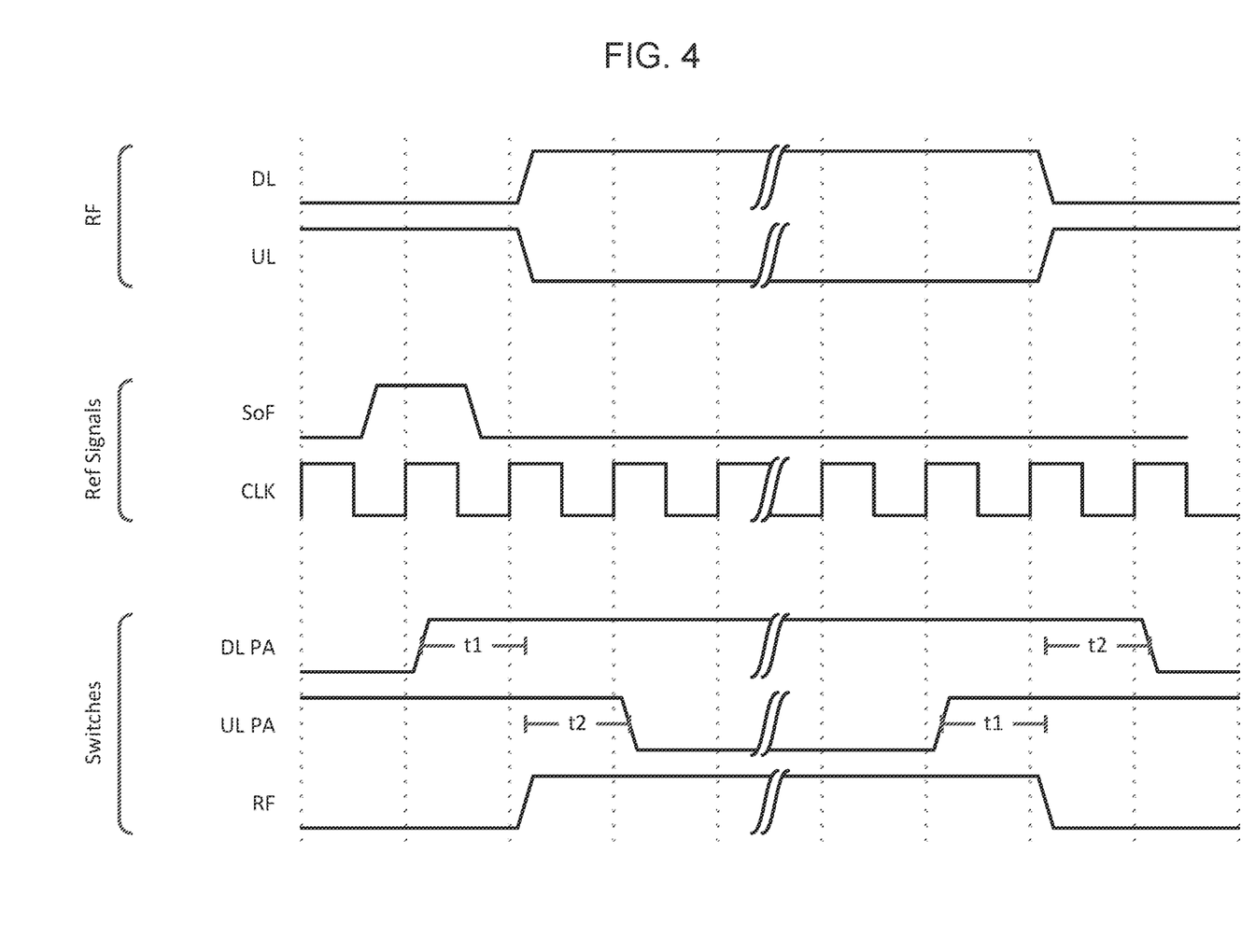
FIGS. 4-5 depict examples of switch timing for uplink and downlink in a TDD repeater system.

With reference now to FIG. 4, an illustrative timing diagram for switching between uplink and downlink for a TDD repeater is depicted. The DL and UL plots show that in this example, the repeater should start in uplink mode, switch to downlink mode, and then switch back to uplink mode. The start-of-frame (SoF) plot indicates the start of the radio frame for downlink as determined by the timing recovery system. The clock (CLK) plot indicates a clock output that can be used to time the switching of the various control lines 351S, 352S, 311S, and 312S in FIG. 3. For example, the CLK output can be included in the 373TH signal that is output from the PLL 373 with holdover. Thus, for example, the DL PA plot illustrates an example of a schedule for switching of the downlink amplifier 311, i.e., the control signal 311S; the UL PA plot illustrates an example of a schedule for switching of the uplink amplifier 312, i.e., the control signal 312S; and the RF signal illustrates an example of a schedule for switching of the RF switches 351, 352, i.e., the control signals 351S, 352S. As illustrated in FIG. 4, in some approaches, the schedules for switching of the uplink and downlink amplifiers can be offset from the schedule for switching of the RF switches. For example, the DL PA can switch on with a time offset t1 before the first toggle of the RF switch, and switch off with a time offset t2 after the second toggle of the RF switch; and the UL PA can switch off with a time offset t2 after the first toggle of the RF switch, and switch on with a time offset t1 before the second toggle of the RF switch. These time offsets t1 and t2 can be used to provide that the amplifiers 311 and 312 are fully turned on or fully turned off before the RF switches are switched to deliver RF energy to the relevant amplifier, therefore reducing any transients due to amplifier turn on or turn off time. In other words, offset time t1 can be a time larger than a turn-on transient time for amplifiers 311 and 312, and offset time t2 can be a time larger than a turn-off transient time for an amplifiers 311 and 312.

Figure 5:
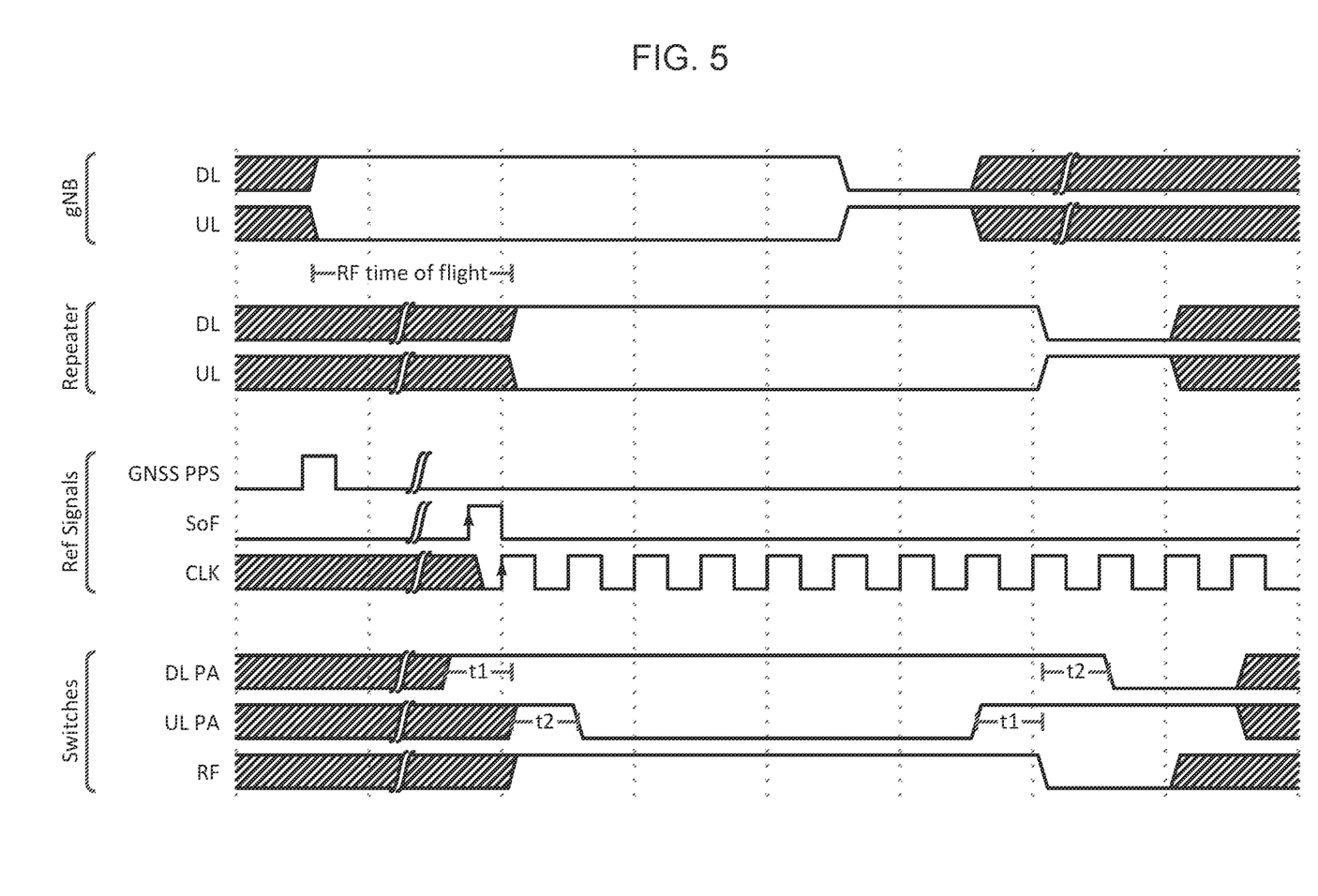

With reference now to FIG. 5, another illustrative example for switching between uplink and downlink for a TDD repeater is depicted. In this example, the slot pattern includes four downlink slots and one uplink slot, as indicated by the schedule for DL and UL at the wireless base station (in this example, the wireless base station is a 5G gNB). As shown in the figure, the start of frame at the repeater can be delayed to account for time of flight of communications signals between the wireless base station and the repeater. The GNSS PPS plot indicates a one pulse per second output of the PLL 373; the CLK plot indicates a clock output of the PLL 373, as in FIG. 4; and the SoF plot indicates a start of radio frame as determined by the timing control unit 360. In this illustrative example, as in FIG. 4, the amplifier switches DL PA and UL PA are advanced or retarded by times t1 and t2 to accommodate turn-on and turn-off transient times for the amplifiers.

In one or more embodiments, a computing device may include one or more embedded logic hardware devices instead of one or more central processing units (CPUs), such as Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the computer device may include one or more hardware microcontrollers instead of a central processing unit (CPU). In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Additionally, in one or more embodiments, the computational resources may be distributed over a cloud computing platform and the like. One or more embodiments include transitory and/or non-transitory computer readable media that can be installed on a computing device.

Embodiments of the invention are set forth in the following numbered clauses:

1. A method of operating a wireless repeater, comprising:
   receiving a reference to absolute time for communication on a wireless network;
   determining a reference to start time of a radio frame relative to the absolute time;
   determining a slot pattern for communication on the wireless network; and
   determining a schedule for switching the wireless repeater between uplink and downlink based on the received absolute time reference, the determined radio frame start time, and the determined slot pattern.
2. The method of clause 1, wherein the determining of the start time of the radio frame includes adding a selected integer multiple of radio frame lengths to a start time of a coordinated universal time (UTC) second.
3. The method of clause 1, wherein the determining of the start time of the radio frame includes offsetting the start time by a time of flight between the repeater and a base station.
4. The method of clause 2, wherein the radio frame lengths are each 10 milliseconds (ms).
5. The method of clause 1, further comprising:
   switching the wireless repeater between uplink and downlink according to the determined schedule.
6. The method of clause 5, wherein the wireless repeater includes one or more RF switches, amplifiers, and/or attenuators, and the switching includes adjusting the one or more RF switches, amplifiers, and/or attenuators.
7. The method of clause 1, wherein the receiving of the reference to absolute time is a receiving from a global navigation satellite system (GNSS) such as Global Positioning System (GPS), Global Navigation Satellite System (GLONASS), or Galileo.
8. The method of clause 7, wherein the receiving from the GNSS is an intermittent receiving with one or more outage intervals, and the determining of the schedule for switching the wireless repeater includes:
   during the one or more outage intervals, approximating the reference to absolute time with a local oscillator.
9. The method of clause 8, wherein the local oscillator is a crystal oscillator that comprises a temperature compensated crystal oscillator (TCXO), oven controlled crystal oscillator (OXCO), voltage controlled crystal oscillator (VCXO), or digital controlled crystal oscillator (DCXO).
10. The method of clause 8, wherein the approximating is an approximating with a phase-locked loop (PLL) in holdover mode coupled to the local oscillator.
11. The method of clause 1, wherein the receiving of the reference to absolute time is a receiving via a non-GNSS synchronization protocol that comprises Institute of Electrical and Electronics Engineers (IEEE) 1588, Synchronous Ethernet (SyncE), or Time Sensitive Networking (TSN).
12. The method of clause 1, wherein:
   the wireless repeater is a repeater for communication within a selected communication frequency band; and
   the determining of the slot pattern and/or radio frame start time is a receiving of the slot pattern and/or radio frame start time within the selected wireless frequency band.
13. The method of clause 1, wherein:
   the wireless repeater is a repeater for communication within a selected communication frequency band; and
   the determining of the slot pattern and/or radio frame start time is a receiving of the slot pattern and/or radio frame start time outside of the selected wireless frequency band.
14. The method of clause 13, wherein the selected communication frequency band is an FR1 or FR2 band for 5G wireless communications.
15. The method of clause 13, wherein the selected communication frequency band is a millimeter wave (mmW) frequency band.
16. The method of clause 13, wherein the receiving outside of the selected wireless frequency band includes a receiving via one or more out-of-band modes or protocols that comprises Ethernet, Global System for Mobile Communications (GSM), Long Term Evolution (LTE), Bluetooth™, or WiFi™.
17. The method of clause 13, wherein the receiving outside of the selected wireless frequency band includes a receiving via key-in during installation of the wireless repeater.
18. The method of clause 13, wherein the receiving outside of the selected wireless frequency band includes a receiving via a device management protocol that comprises Lightweight Machine to Machine (LWM2M), Open Mobile Alliance Device Management (OMA-DM), or Message Queues Telemetry Transport (MQTT).

19. The method of clause 18, wherein the receiving via the device management protocol includes a receiving from a cloud-based management system or device management server.

20. The method of clause 1, wherein the determining of the schedule for switching the wireless repeater includes:
 determining a nominal start time for an uplink or downlink time interval within the radio frame; and
 offsetting an actual start time for the uplink or downlink time interval to be earlier or later than the nominal start time by a selected offset amount.

21. The method of clause 1, wherein the determining of the schedule for switching the wireless repeater includes:
 determining a nominal end time for an uplink or downlink time interval within the radio frame; and
 offsetting an actual end time for the uplink or downlink time interval to be earlier or later than the nominal end time by a selected offset amount.

22. The method of clause 20 or 21, wherein the selected offset amount includes an offset for transient time for switching the wireless repeater between uplink or downlink according to the determined schedule.

23. A wireless repeater, comprising:
 a first antenna for communication with a wireless base station;
 a second antenna for communication with user equipment;
 one or more switches, amplifiers, and/or attenuators coupled to the first and second antennas for alternation between uplink and downlink modes; and
 a timing recovery system coupled to the one or more switches, amplifiers, and/or attenuators and configured to carry out the method of any of clauses 1-22.

24. A computer-readable medium storing instructions to cause a wireless repeater to carry out the method of any of clauses 1-22.

25. A system, comprising: a cloud-based management system or device management server configured to transmit the received slot pattern and/or radio frame of clause 19.

What is claimed as new and desired to be protected by Letters Patent of the United States is:

1. A method of operating a wireless repeater, comprising:
 receiving a reference to absolute time for communication on a wireless network;
 determining a reference to start time of a radio frame relative to the absolute time;
 determining a slot pattern for communication on the wireless network;
 determining a schedule for switching the wireless repeater between uplink and downlink based on the received absolute time reference, the determined radio frame start time, and the determined slot pattern;
 wherein the wireless repeater is a repeater for communication within a selected communication frequency band; and
 wherein the determining of one or more of the slot pattern or the radio frame start time includes receiving one or more of the slot pattern or the radio frame start time outside of the selected communication frequency band.

2. The method of claim 1, wherein the determining of the start time of the radio frame includes adding a selected integer multiple of radio frame lengths to a start time of a coordinated universal time (UTC) second.

3. The method of claim 1, wherein the determining of the start time of the radio frame includes offsetting the start time by a time of flight between the repeater and a base station.

4. The method of claim 1, further comprising:
 switching the wireless repeater between uplink and downlink according to the determined schedule.

5. The method of claim 4, wherein the wireless repeater includes one or more RF switches, amplifiers, and/or attenuators, and the switching includes adjusting the one or more RF switches, amplifiers, and/or attenuators.

6. The method of claim 1, wherein the receiving of the reference to absolute time is a receiving from a global navigation satellite system (GNSS) that comprises one or more of Global Positioning System (GPS), Global Navigation Satellite System (GLONASS), or Galileo.

7. The method of claim 6, wherein the receiving from the GNSS is an intermittent receiving with one or more outage intervals, and the determining of the schedule for switching the wireless repeater includes:
 during the one or more outage intervals, approximating the reference to absolute time with a local oscillator.

8. The method of claim 7, wherein the approximating is an approximating with a phase-locked loop (PLL) in holdover mode coupled to the local oscillator.

9. The method of claim 1, wherein the receiving of the reference to absolute time is a receiving via a non-GNSS synchronization protocol that comprises Institute of Electrical and Electronics Engineers (IEEE) 1588, Synchronous Ethernet (SyncE), or Time Sensitive Networking (TSN).

10. A method of operating a wireless repeater, comprising:
 receiving a reference to absolute time for communication on a wireless network;
 determining a reference to start time of a radio frame relative to the absolute time;
 determining a slot pattern for communication on the wireless network;
 determining a schedule for switching the wireless repeater between uplink and downlink based on the received absolute time reference, the determined radio frame start time, and the determined slot pattern;
 wherein the wireless repeater is a repeater for communication within a selected communication frequency band; and
 wherein the determining of the slot pattern and/or radio frame start time is a receiving of the slot pattern and/or radio frame start time within the selected wireless frequency band.

11. The method of claim 1, wherein the selected communication frequency band is a millimeter wave (mmW) frequency band.

12. The method of claim 1, wherein the receiving outside of the selected wireless frequency band includes a receiving via one or more out-of-band modes or protocols that comprises Ethernet, Global System for Mobile Communications (GSM), Long Term Evolution (LTE), Bluetooth™, or WiFi™.

13. The method of claim 1, wherein the receiving outside of the selected wireless frequency band includes a receiving via key-in during installation of the wireless repeater.

14. The method of claim 1, wherein the receiving outside of the selected wireless frequency band includes a receiving via a device management protocol that comprises Lightweight Machine to Machine (LWM2M), Open Mobile Alliance Device Management (OMA-DM), or Message Queues Telemetry Transport (MQTT).

15. The method of claim 14, wherein the receiving via the device management protocol includes a receiving from a cloud-based management system or device management server.

16. The method of claim 1, wherein the determining of the schedule for switching the wireless repeater includes:
   determining a nominal start time for an uplink or downlink time interval within the radio frame; and
   offsetting an actual start time for the uplink or downlink time interval to be earlier or later than the nominal start time by a selected offset amount greater than or equal to a transient time for switching the wireless repeater between uplink and downlink.

17. The method of claim 1, wherein the determining of the schedule for switching the wireless repeater includes:
   determining a nominal end time for an uplink or downlink time interval within the radio frame; and
   offsetting an actual end time for the uplink or downlink time interval to be earlier or later than the nominal end time by a selected offset amount greater than or equal to a transient time for switching the wireless repeater between uplink and downlink.

18. A wireless repeater, comprising:
   a first antenna for communication with a wireless base station;
   a second antenna for communication with user equipment;
   one or more of switches, amplifiers, or attenuators coupled to the first and second antennas for alternation between uplink and downlink modes; and
   a timing recovery system coupled to the one or more of switches, amplifiers, or attenuators and configured to carry out a method to operate the wireless repeater, comprising:
   receiving a reference to absolute time for communication on a wireless network;
   determining a reference to start time of a radio frame relative to the absolute time;
   determining a slot pattern for communication on the wireless network; and
   determining a schedule for switching the wireless repeater between uplink and downlink based on the received absolute time reference, the determined radio frame start time, and the determined slot pattern.

19. A system, comprising:
   a wireless receiver configured to perform a method of operation, comprising:
      receiving a reference to absolute time for communication on a wireless network;
      determining a reference to start time of a radio frame relative to the absolute time;
      determining a slot pattern for communication on the wireless network;
      determining a schedule for switching the wireless repeater between uplink and downlink based on the received absolute time reference, the determined radio frame start time, and the determined slot pattern; and
   wherein the wireless repeater is a repeater for communication within a selected communication frequency band;
   wherein the determining of one or more of the slot pattern or the radio frame start time includes receiving one or more of the slot pattern or the radio frame start time outside of the selected communication frequency band;
   wherein the receiving outside of the selected wireless frequency band includes a receiving via a device management protocol that comprises Lightweight Machine to Machine (LWM2M), Open Mobile Alliance Device Management (OMA-DM), or Message Queues Telemetry Transport (MQTT);
   wherein the receiving via the device management protocol includes receiving from one or more of a cloud-based management system or a device management server; and
   wherein the one or more of the cloud-based management system or the device management server is configured to transmit one or more of the received slot pattern or the radio frame.

* * * * *